US012508209B1

(12) United States Patent
Roach et al.

(10) Patent No.: US 12,508,209 B1
(45) Date of Patent: Dec. 30, 2025

(54) ANTI-SPILL PILL COUNTING TRAY

(71) Applicant: The Government of the United States as represented by the Secretary of the Air Force, Wright-Patterson AFB, OH (US)

(72) Inventors: Jess Roach, Whiteman AFB, MO (US); Brandon Ward, Whiteman AFB, MO (US); Blake Gillund, Warrensburg, MO (US); Emily Lucas, Whiteman AFB, MO (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/902,864

(22) Filed: Sep. 30, 2024

Related U.S. Application Data

(60) Provisional application No. 63/693,249, filed on Sep. 11, 2024.

(51) Int. Cl.
*A61J 7/02* (2006.01)

(52) U.S. Cl.
CPC ........................................ *A61J 7/02* (2013.01)

(58) Field of Classification Search
CPC .. A61J 7/02; A61J 7/0069; A24C 5/02; B65D 47/20; B65D 47/261; B67D 2001/082; B67D 1/0085; B67D 1/1231; B67D 1/1277; B67D 1/0081; B67D 7/005
USPC ............... 222/207, 212, 185.1, 517; 414/675
See application file for complete search history.

(56) References Cited

U.S. PATENT DOCUMENTS 1,813,131 A * 7/1931 Andrassy ............... A47G 19/24 222/557
2,530,009 A * 11/1950 Fields ........................ A61J 7/02 222/572
3,111,242 A * 11/1963 Paul ........................ A47J 47/01 222/189.02
3,402,827 A * 9/1968 White ........................ A61J 7/02 414/675
4,261,683 A 4/1981 Zaleon
4,643,316 A 2/1987 Hoffman
(Continued)

FOREIGN PATENT DOCUMENTS

WO WO-2008027290 A2 * 3/2008 ............. G06V 20/66

*Primary Examiner* — Gregory W Adams
(74) *Attorney, Agent, or Firm* — AFMCLO/JAZ; Richard M. Mescher

(57) ABSTRACT

A pharmacy pill tray includes a viewing platform with a floor surface to support pills thereon, and a generally cylindrical-shaped transfer chamber. The transfer chamber includes a semi-cylinder trough with an open top extending along and below an edge of the floor surface and a semi-cylinder door secured to the trough to open and close the open top of the trough. The transfer chamber is configured to selectively receive at least some of the pills from the floor surface. The door includes a primary door portion pivotably secured to the trough, and a secondary door portion pivotably secured to the primary door portion. A dispensing spout extends from an open end of the trough for dispensing the pills from the trough. A transfer gate is movable between a blocking position which prevents dispensing the pills through the spout, and a dispensing position which permits dispensing the pills through the spout.

19 Claims, 10 Drawing Sheets

(56) References Cited

U.S. PATENT DOCUMENTS

| | | | | | |
|---|---|---|---|---|---|
| D342,572 | S | | 12/1993 | Lapsker et al. | |
| 5,433,256 | A | * | 7/1995 | Vasers | B65B 39/007<br>141/370 |
| 6,196,426 | B1 | | 3/2001 | White | |
| 7,412,302 | B2 | * | 8/2008 | Cobb | G07F 11/44<br>700/231 |
| 8,118,944 | B2 | * | 2/2012 | Fay | A61J 7/02<br>134/21 |
| 9,956,145 | B2 | * | 5/2018 | Thompson | A61J 7/00 |
| 10,238,578 | B2 | * | 3/2019 | Chessa | G01G 19/42 |
| 10,370,175 | B2 | * | 8/2019 | Paz | B65D 83/0463 |
| D950,952 | S | * | 5/2022 | Kennedy, III | D24/227 |
| D950,953 | S | * | 5/2022 | Kennedy, III | D24/227 |
| 2019/0060177 | A1 | * | 2/2019 | Leahy | A61J 7/02 |

* cited by examiner

ANTI-SPILL PILL COUNTING TRAY

CROSS-REFERENCE TO RELATED APPLICATIONS

This application claims the benefit of priority under 35 U.S.C. § 119(e) to U.S. Provisional Application Ser. No. 63/693,249 entitled "ANTI-SPILL PILL COUNTING TRAY" filed 11 Sep. 2024. The contents of which is expressly incorporated herein by reference in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to pharmacy pill counting and/or viewing trays and, more particularly, to a pharmacy pill counting and/or viewing tray that reduces inadvertent spills.

BACKGROUND OF THE INVENTION

Many pharmacies store pills in large bulk-stock containers. The pills are then counted, packaged into smaller containers, labeled for use, and dispensed to customers as needed. The classic tool for counting pills is a manual pill counting tray. To use a manual pill counting tray, the user first deposits an unknown quantity of pills from a bulk-stock container onto a counting surface or platform of the pill counting tray. A spatula or the like is then used to move pills from this counting surface into an adjoining depressed trough or other dispensing means. The pills moved into the trough are destined to be dispensed. Therefore, the pharmacist is required to remember the changing count of pills reaching the trough throughout the counting process. Once the desired quantity of pills is in the trough, the pharmacist closes a lid over the trough that blocks further pills from being deposited into the trough. By tilting the pill counting tray toward a return funnel or spout, the pharmacist can return uncounted pills, still located on the counting platform, back into the bulk-stock container. By tilting the pill counting tray in a different direction, the counted pills located within the trough are released from the trough through a dispense funnel or spout into a small prescription container such as, for example but not limited to, a vial, bottle, or the like. At any one pharmacy, this process can be repeated several hundred times during a single day.

These manual pill counting trays have many virtues including durability, low cost, universal applicability to pills of varying shapes and sizes, minimal training requirements, and reputation as a time-honored standard to achieve pill dispensation. In addition, as pills are damaged or different pills are intermixed, it provides an opportunity for the pharmacist to visually assess the pills and remove any damaged pills and/or incorrect type of pills as they are counted.

However, these manual pill counting trays also have drawbacks including accuracy limited to the capability of the pharmacist and concomitant limitations in speed of use. Reliance on human vision and memory as a means of counting is inherently error prone. This inaccuracy can further be explained by distractions that disrupt concentration of the pharmacist while counting. Additionally, the pills can be inadvertently spilled from the pill counting tray, for example but not limited to, when the counting surface is inadvertently tilted too far toward the return funnel or spout, when the trough is inadvertently tilted too far toward the dispense funnel or spout, and/or when the pills are directed into the trough with too much force. It should also be noted that the process itself is fatiguing, thus increasing the likelihood of such user errors.

To improve drug distribution, control inventory, reduce labor, and decrease medication errors, many pharmacies have implemented automated systems for filling prescriptions. However, despite these benefits, and contrary to expectations, studies have shown that the number of prescription filling errors tends to increase with the implementation of automated systems.

As a result, all automatically filled prescriptions are required to undergo a process known as Full Visual Verification (FVV). This FVV process requires a pharmacist to pour the contents of each automatically filled prescription vial onto a pill counting tray to ensure product consistency. Upon verification that a prescription contains the correct type and number of pills, the pharmacist transfers the contents of the pill counting tray back into the prescription vial. The high volume of prescriptions filled in a typical pharmacy each day often requires the pharmacists to perform the FVV process for many automatically filled prescriptions in sequence. This highly repetitive process of transferring large numbers of pills to and from their respective containers naturally lends itself to errors. One such error, with potentially life-threatening consequences, is commingling of medications due to the inadvertent transfer of stray pill(s) from one prescription vial to another. Structural features of the pill counting tray itself, such as crevices in which pills become temporarily lodged and/or blind spots that limit the pharmacist's ability to identify stray pills, can be a significant factor in these comingling events. In view of the unlimited variety of pill sizes, colors, and shapes (e.g., round, oblong, oval, elliptical, square, cylindrical, rectangular, diamond-shaped, cone-shaped triangular, crescent-shaped, trapezoidal, pentagonal, hexagonal, heptagonal, octagonal etc.) even minor surface disruptions within a pill viewing tray represent potential areas in which a pill may become lodged.

Accordingly, an improved pharmacy pill counting and/or viewing tray is needed that enables pharmacists to dispense prescription vial contents and/or verify the accuracy and consistency of prescription vial contents in a safe and efficient manner.

SUMMARY OF THE INVENTION

The present invention overcomes at least some of the foregoing problems and other shortcomings, drawbacks, and challenges of manually dispensing pills. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a pharmacy pill tray comprises a viewing platform having a substantially-planar floor surface configured to support the pills thereon, and a trough with an open top extending along and below an edge of the substantially-planar floor surface and configured to selectively receive at least some of the pills from the floor surface. The trough is generally a semi-cylinder having a closed end and an open end and a dispensing spout extends from the open end of the trough for selectively dispensing the pills from the trough. A transfer gate is selectively movable between a blocking position to prevent dispensing the pills from the trough through the spout, and a dispensing position to permit dispensing the pills from the trough through the spout.

According to another embodiment of the present invention, a pharmacy pill tray comprises a viewing platform comprising a substantially-planar floor surface configured to support the pills thereon and a transfer chamber including a semi-cylinder trough with an open top extending along and below an edge of the substantially-planar floor surface and configured to selectively receive at least some of the pills from the floor surface, and a semi-cylinder door pivotably secured to the trough to selectively open and close the open top of the trough. The transfer chamber has a closed end and an open end. The semi-cylinder door includes a primary door portion pivotably secured to the trough, and a secondary door portion pivotably secured to the primary door portion. The primary and secondary door portions are configured to form a small gap along the substantially-planar floor surface when the primary door portion is closed and the secondary door portion is open so that at least some of the pills can be moved from the floor surface to the trough through the gap and configured to close the gap when both the primary door portion and the secondary door portion are closed so that the pills cannot be moved from the substantially-planar floor surface to the trough through the gap. A dispensing spout extends from the open end of the trough for selectively dispensing the pills from the trough.

According to yet another embodiment of the invention, a pharmacy pill tray comprises a viewing platform comprising a substantially-planar and upward-facing floor surface configured to support the pills thereon, and a generally cylindrical-shaped and horizontally-extending transfer chamber including a semi-cylinder trough with an open top extending along and below an edge of the substantially-planar floor surface and configured to selectively receive at least some of the pills from the floor surface, and a semi-cylinder door pivotably secured to the trough to selectively open and close the open top of the trough. The semi-cylinder door includes a primary door portion pivotably secured to the trough, and a secondary door portion pivotably secured to the primary door portion. The transfer chamber has a closed end and an open end. A dispensing spout extending from the open end of the trough for selectively dispensing the pills from the trough, and a transfer gate is selectively movable between a blocking position to prevent dispensing the pills from the trough through the spout, and a dispensing position to permit dispensing the pills from the trough through the spout.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of embodiments of the present invention. Furthermore, these are examples of reduction to practice of the present invention and confirmation that the principles described in the present invention are therefore valid but should not be construed as in any way limiting the scope of the invention.

Figure 1:
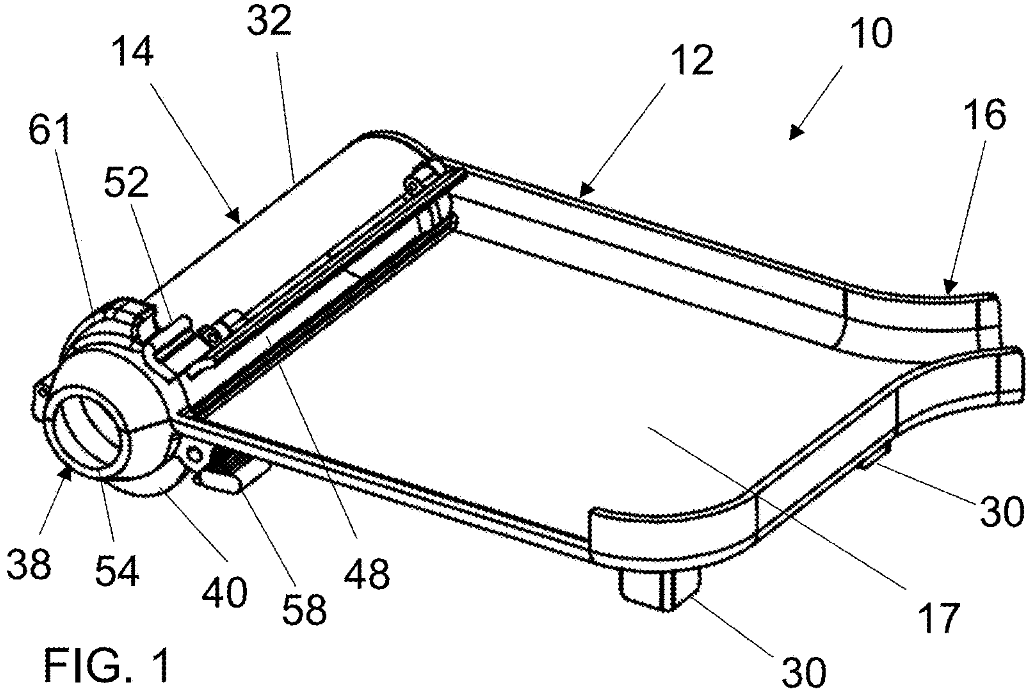
FIG. 1 is a perspective view of a pill counting and/or viewing tray according to an embodiment of the present invention.
Figure 2:
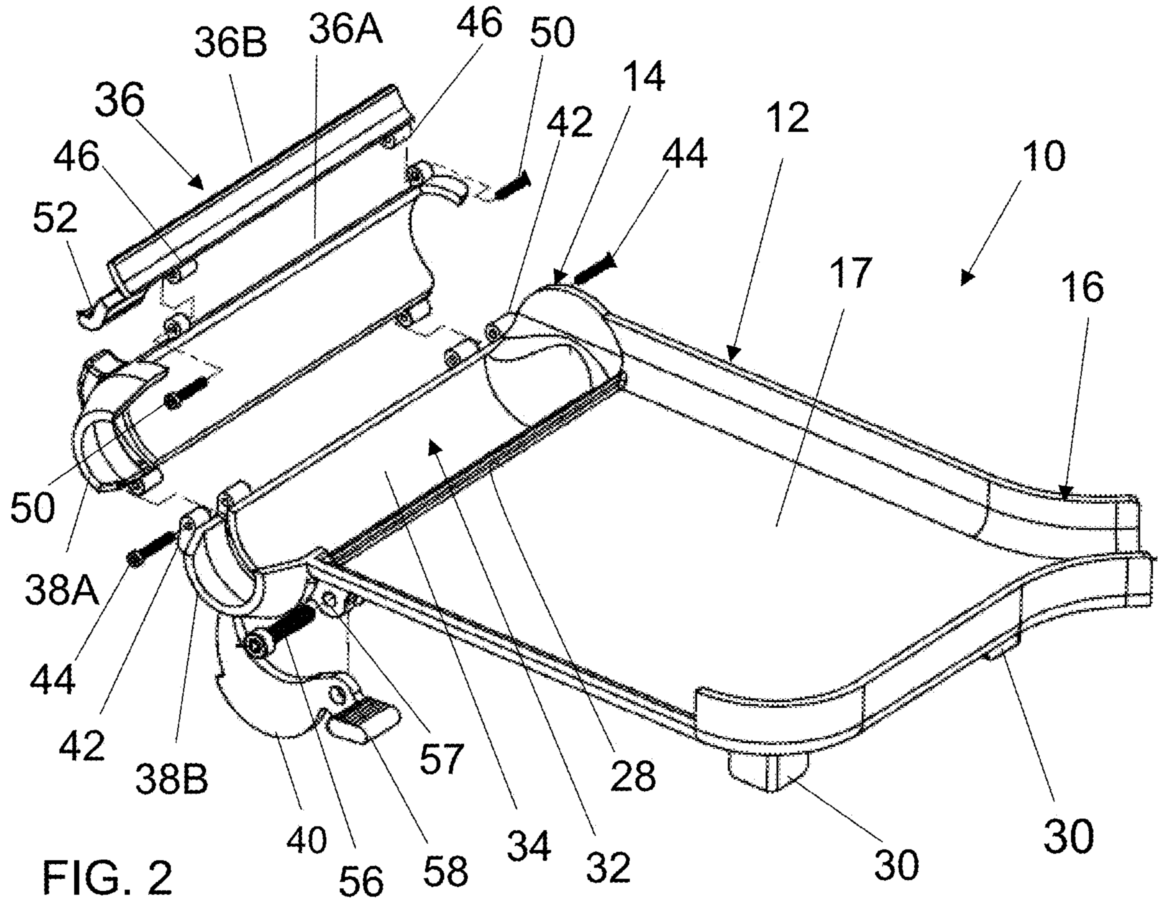
FIG. 2 is an exploded perspective view of the pill counting and/or viewing tray of FIG. 1.
Figure 3:
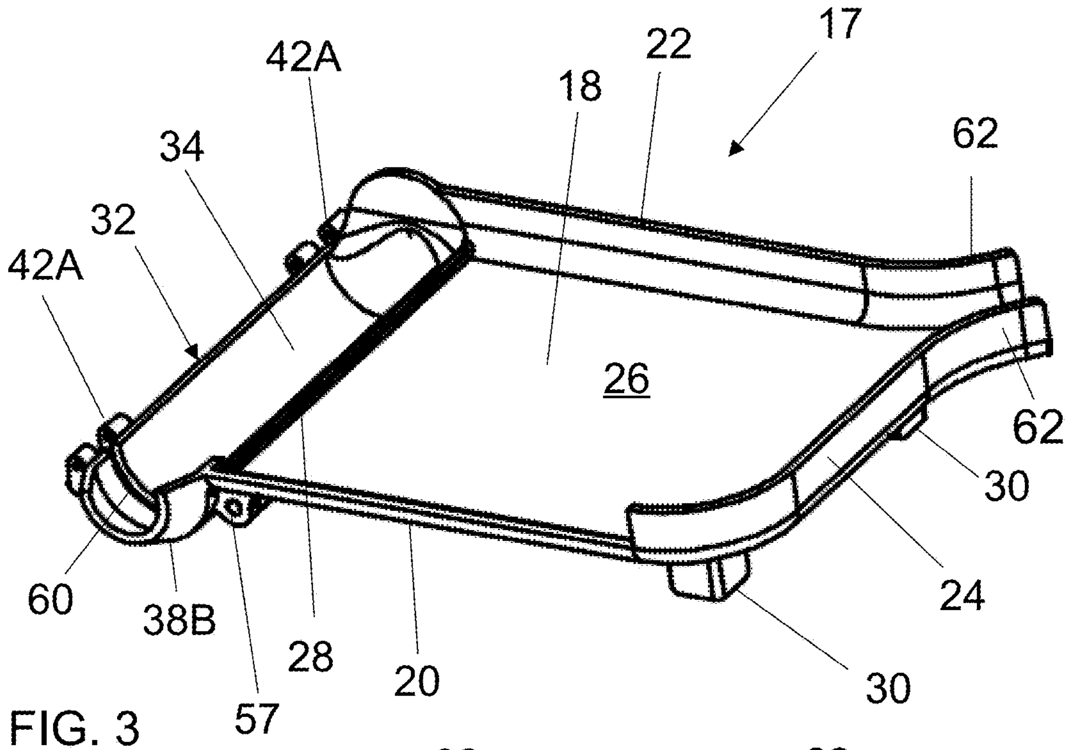
FIG. 3 is a perspective view of a counting or viewing platform of the pill counting and/or viewing tray of FIGS. 1 and 2.
Figure 4:
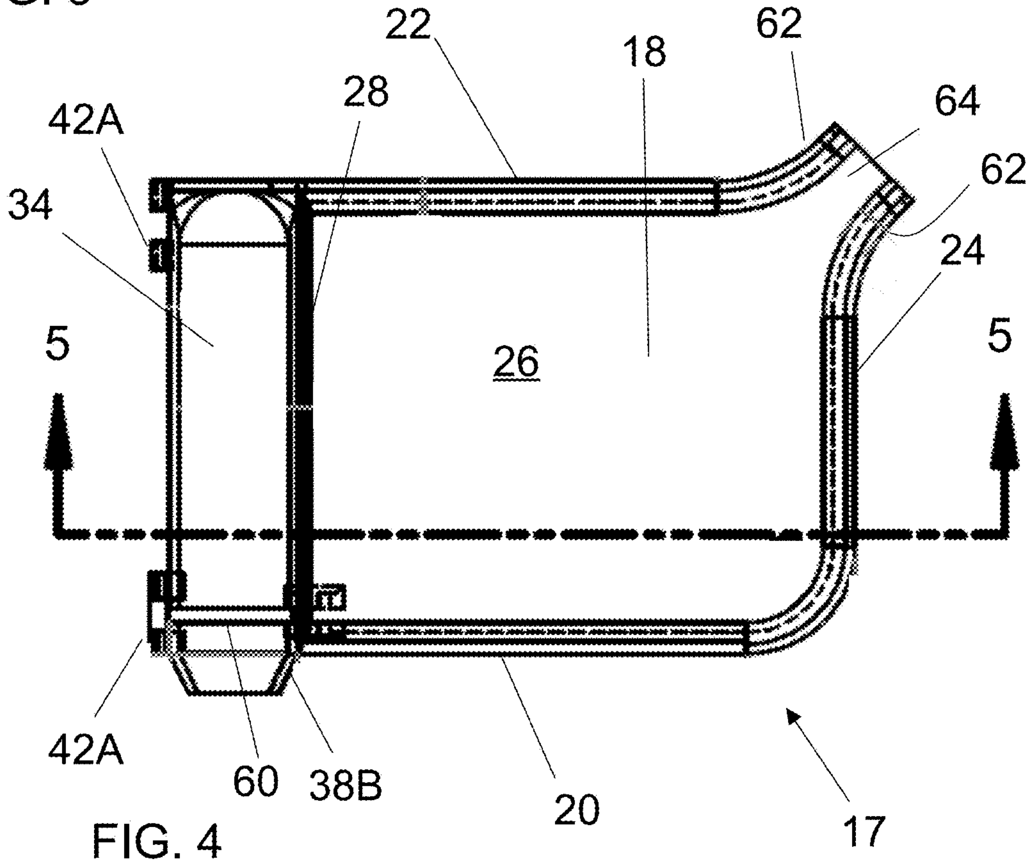
FIG. 4 is a top plan view of the counting or viewing platform of FIG. 3.
Figure 5:
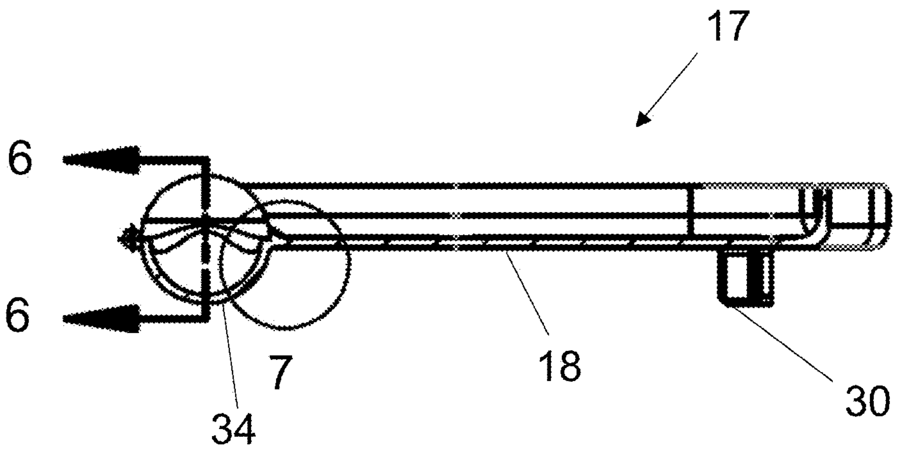
FIG. 5 is a cross-sectional view taken along line 5-5 of FIG. 4.
Figure 6:
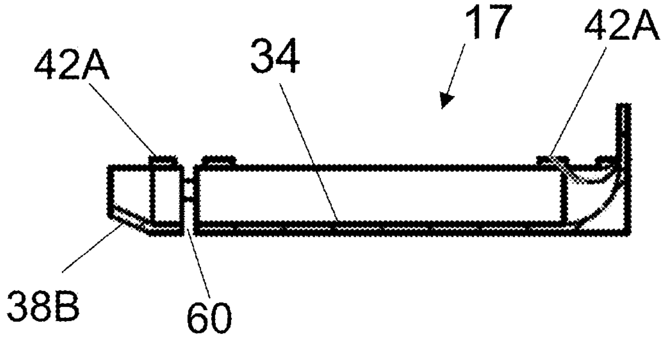
FIG. 6 is a cross-sectional view taken along line 6-6 of FIG. 5.
Figure 7:
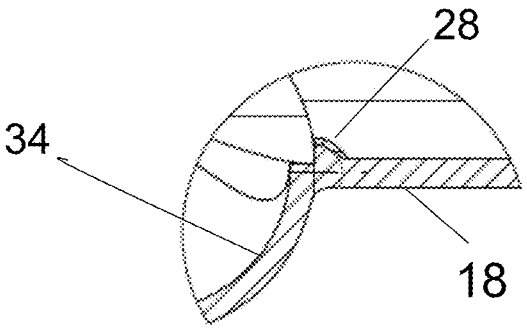
FIG. 7 is an enlarged and fragmented view taken at line 7 of FIG. 5.
Figure 8:
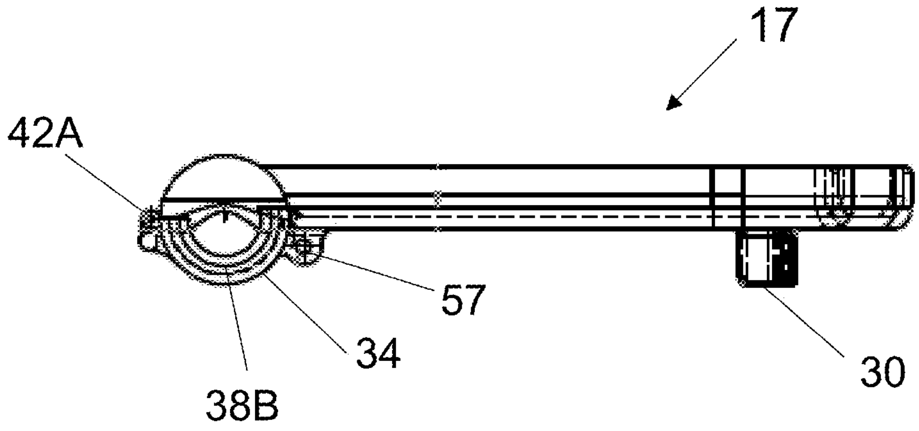
FIG. 8 is a front elevational view of the counting or viewing platform of FIGS. 3 to 7 showing a thread engagement tab.
Figure 9:
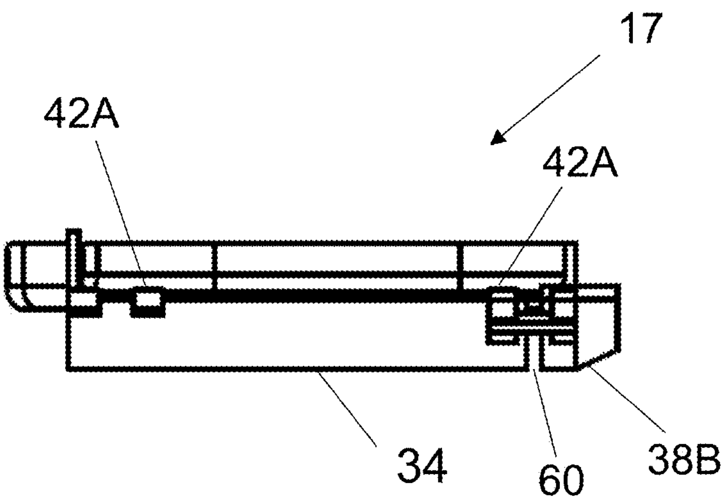
FIG. 9 is a right-side elevational view of the counting or viewing platform of FIGS. 3 to 8.
Figure 10:
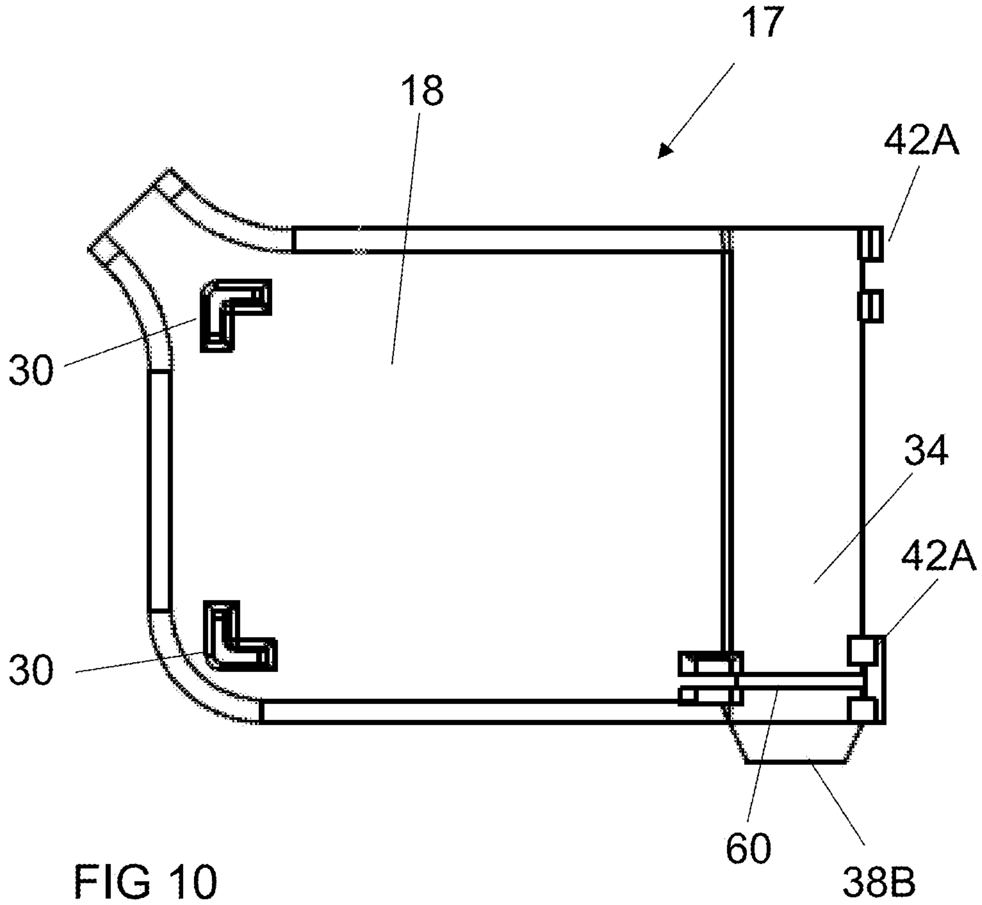
FIG. 10 is bottom view of the counting or viewing platform of FIGS. 3 to 9.
Figure 11:
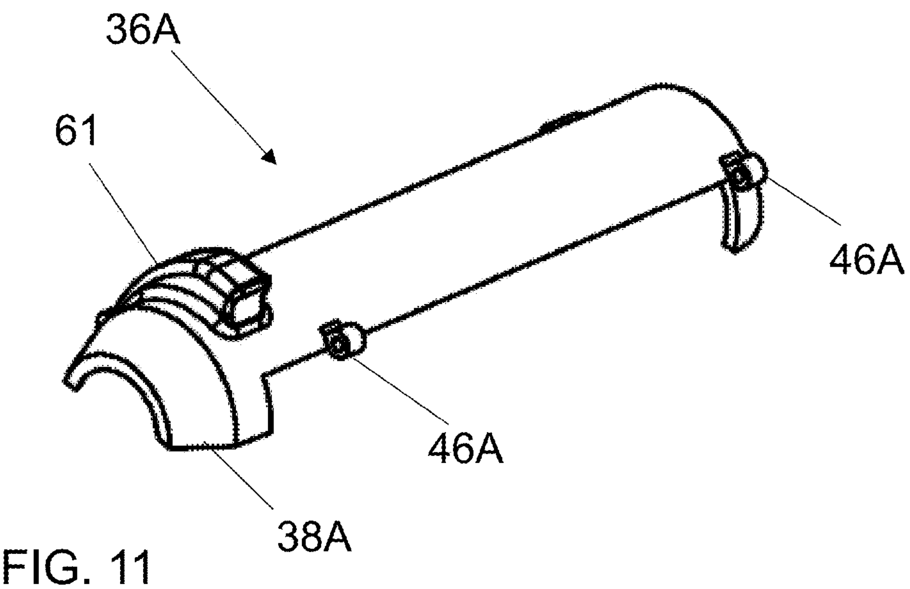
FIG. 11 is a perspective view of a primary lid of the pill counting and/or viewing tray of FIGS. 1 and 2.
Figure 12:
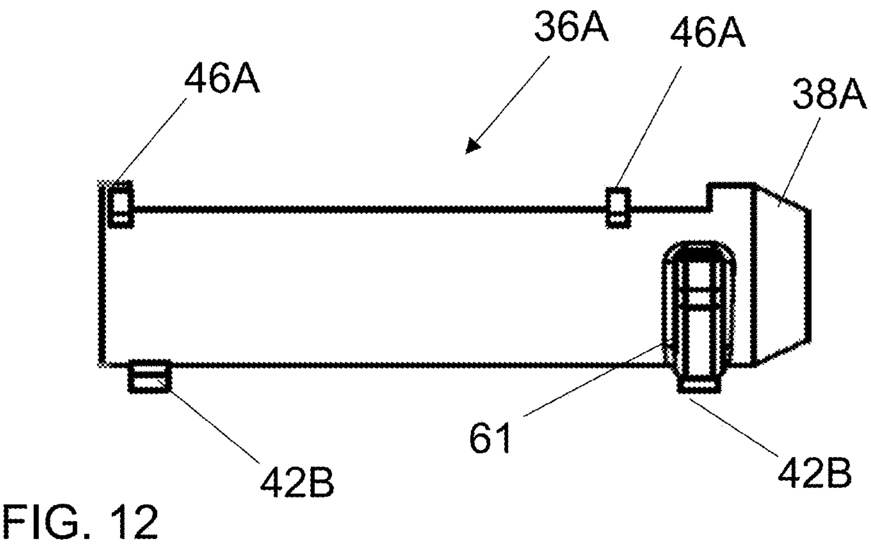
FIG. 12 is top plan view of the primary lid of FIG. 11.
Figure 13:
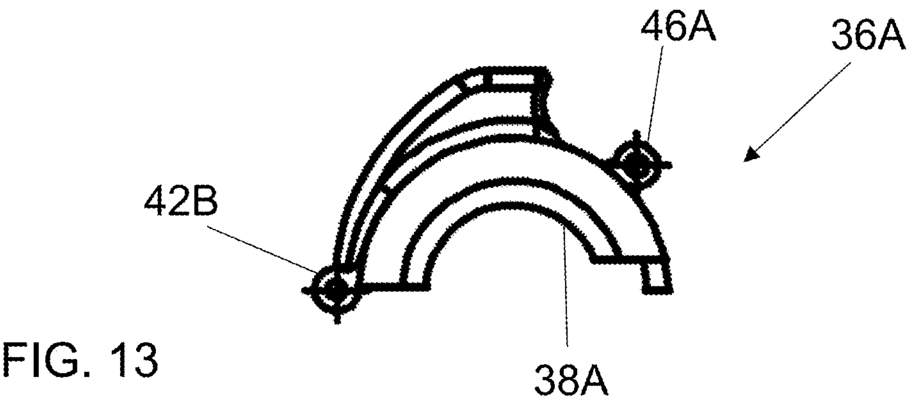
FIG. 13 is a front elevational view of the primary lid of FIGS. 11 and 12.
Figure 14:
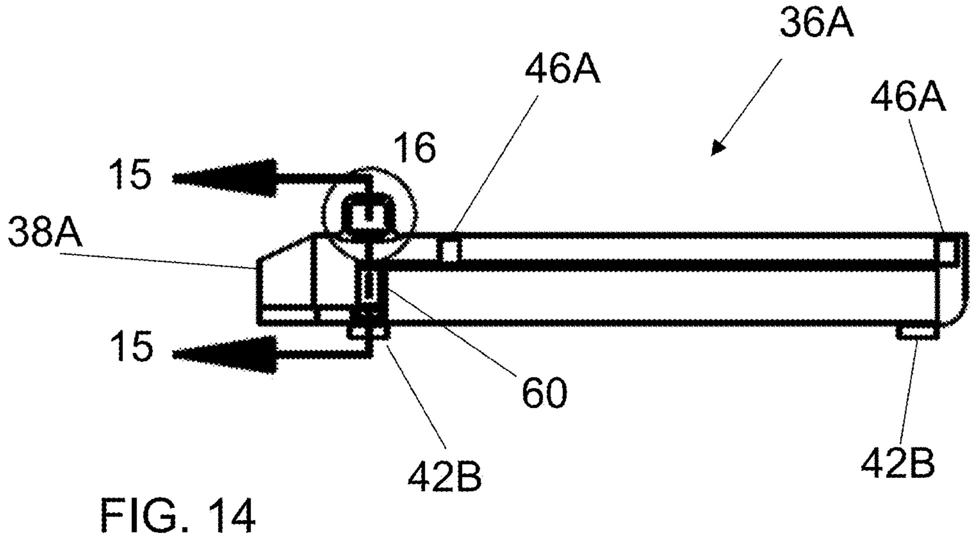
FIG. 14 is a left-side elevational view of the primary lid of FIGS. 11 to 13.
Figure 15:
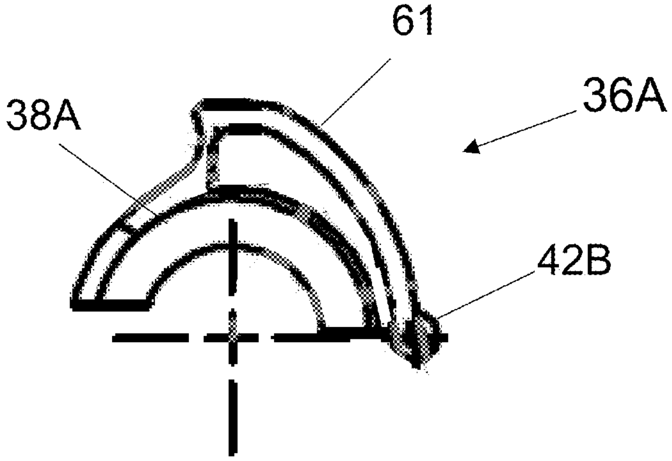
FIG. 15 is a sectional view taken along line 15-15 in FIG. 14.
Figure 16:
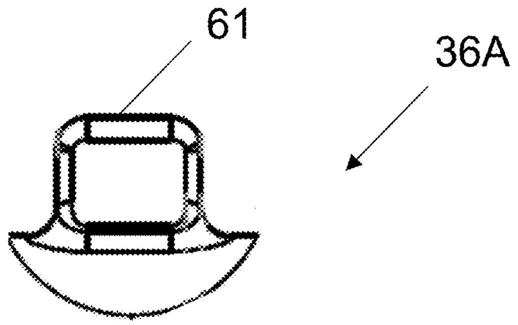
FIG. 16 is an enlarged and fragmented view taken at line 16 of FIG. 16.
Figure 17:
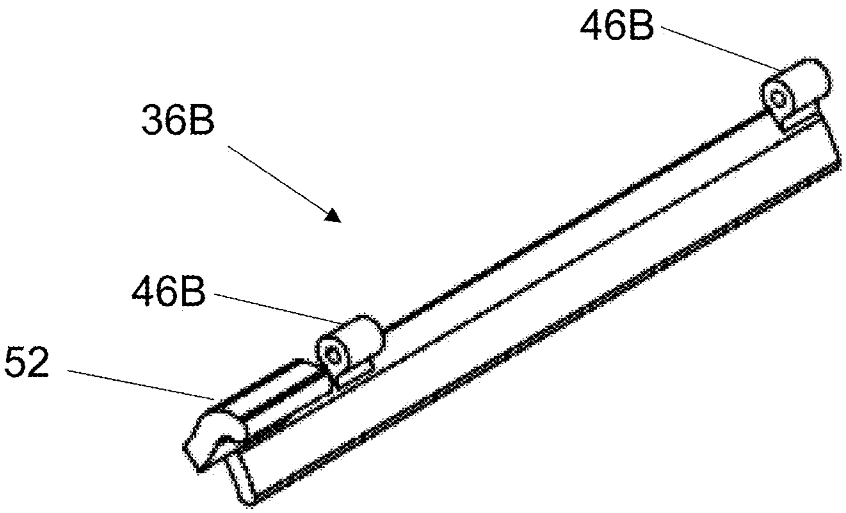
FIG. 17 is a perspective view of a secondary lid of the pill counting and/or viewing tray of FIGS. 1 and 2.
Figure 18:
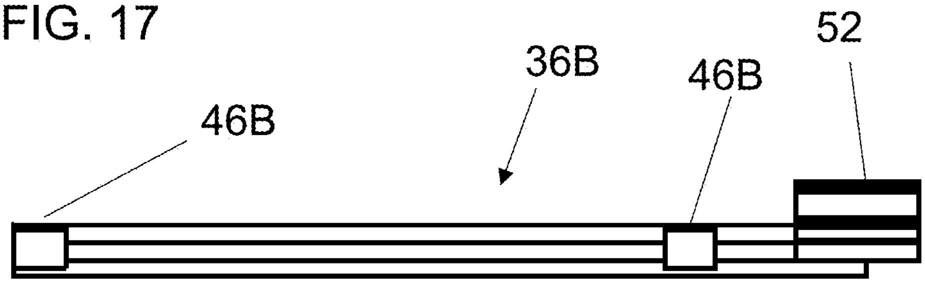
FIG. 18 is a top plan view of the secondary lid of FIG. 17.
Figure 19:
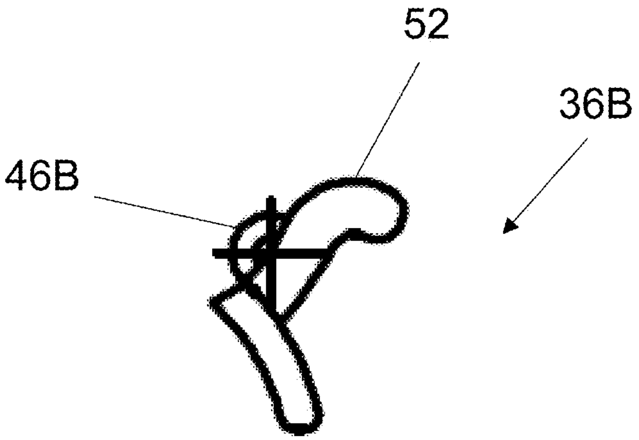
FIG. 19 is a front elevational view of the secondary lid of FIGS. 17 and 18.
Figure 20:
FIG. 20 is a right-side elevational view of the secondary lid of FIGS. 17 to 19.
Figure 21:
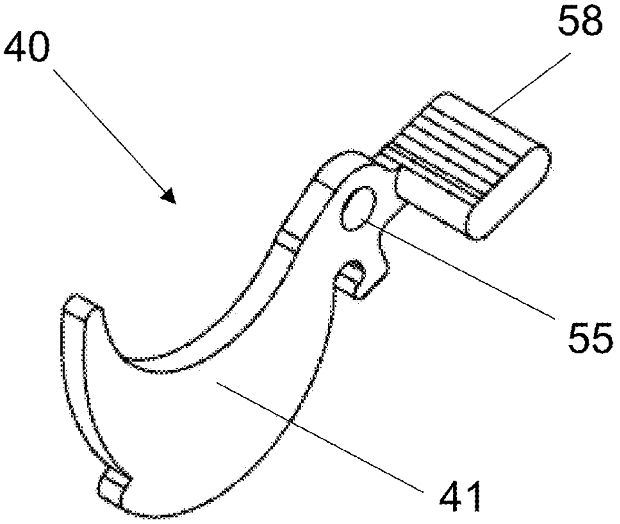
FIG. 21 is a perspective view of a transfer gate of the pill counting and/or viewing tray of FIGS. 1 and 2.
Figure 22:
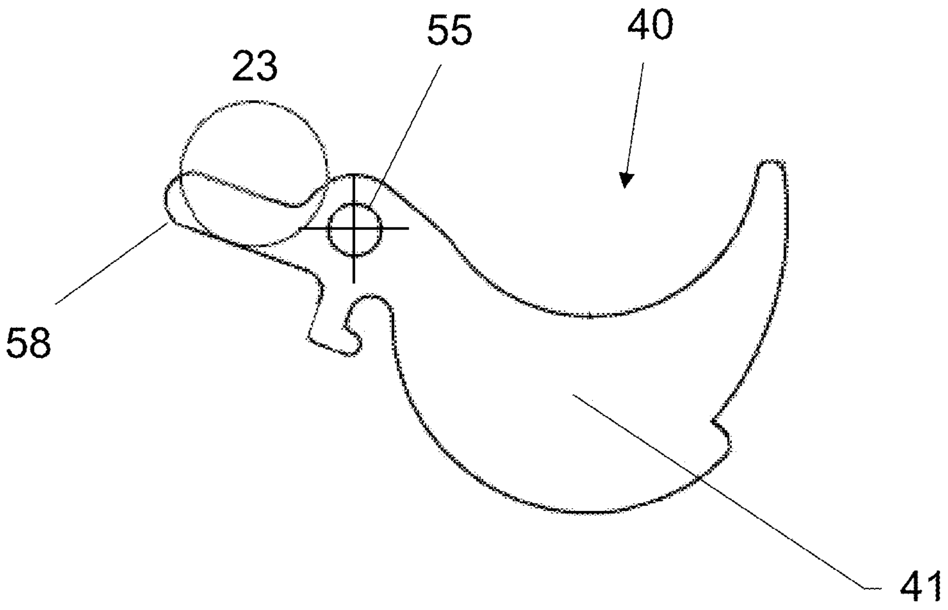
FIG. 22 is an enlarged and fragmented view taken at line 23 of FIG. 22.
Figure 23:
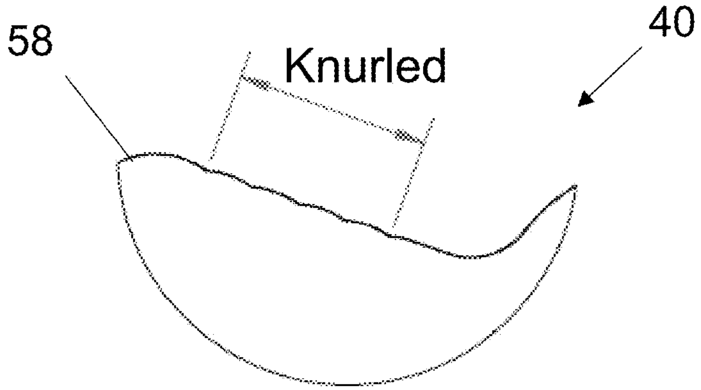
FIG. 23 is a fragmented bottom view of the pill counter and/or viewer tray of FIGS. 11 and 12.
Figure 24:
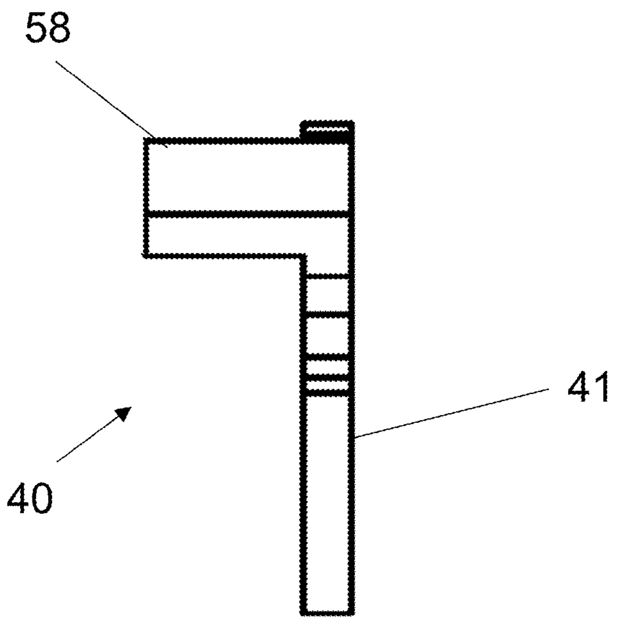
FIG. 24 is a rear elevational view of the transfer gate of FIGS. 21 to 23.
Figure 25:
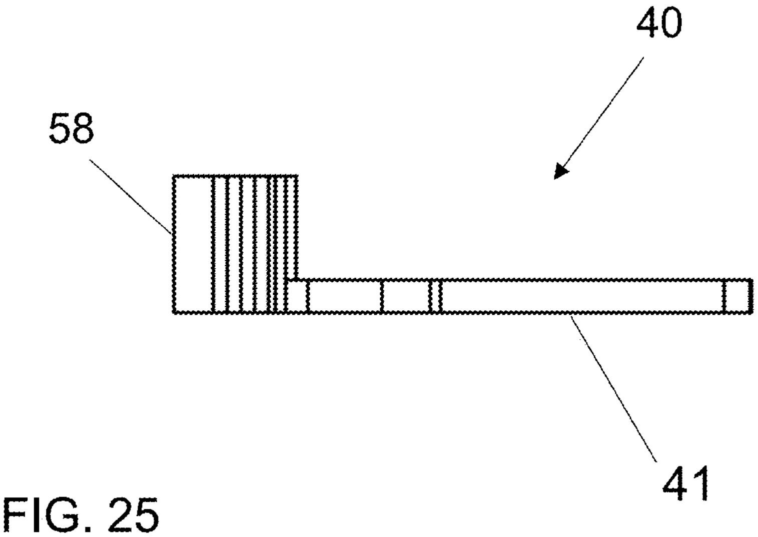
FIG. 25 is a top plan view of the transfer gate of FIGS. 21 to 24.

Referring to the drawings, and to FIGS. 1 and 2 in particular, a pill counter and/or viewer tray 10 in accordance with an exemplary embodiment of the present invention is illustrated. The pill counter and/or viewer tray 10 may be interchangeably referred to herein as a "pill viewer", a "pill counter, or a "pill tray." As used in this specification and the claims, the term "pill" means any suitable pharmaceutical dosage form for example, but not limited to caplets, capsules, chewables, gelcaps, meltlets, spansules, softgels, tablets, and the like.

The illustrated pill counter and/or viewer tray 10 preferably comprises a first or viewing portion 12, a second or transfer portion 14 extending generally leftward from the viewing portion 12, and a third or return portion 16 extending generally rearward from the connecting portion 14. As best shown in FIGS. 3 to 10, the illustrated viewing portion 12, a portion of the illustrated transfer portion 14, the illustrated return portion 16, are formed together as a single one-piece component as described in more detail hereinafter. It is noted however, that alternatively the pill counter and/or viewer tray 10 can be formed by any number of separate components that secured together.

As best shown in FIGS. 3 to 10, the first or viewing portion 12 comprises a counting or viewing platform 17 having a substantially-planar main wall 18, a first or front-side wall 20, a second or rear-side wall 22, and a third or left-side wall 24. The illustrated main wall 18 is substantially rectangular shaped but any other suitable shape can alternatively be utilized. The illustrated main wall 18 forms a substantially horizontal and upward-facing floor surface 26 for supporting the pills. The floor surface 26 is preferably smooth and free of any structures or defects which may impede the free movement of the pills along the floor surface 26 except for a lip 28 extending along a right edge of the main wall 18 (best seen in FIG. 7). The lip 28 extends above the floor surface 26 an amount which provides a desired resistance to the pills sliding off the right edge of the main wall 18 as described in more detail hereinafter. The lip 28 reduces the likelihood that the pills will unintentionally slide into the transfer portion 16.

The illustrated front-side wall 20 upwardly extends from a front edge of the main wall 18 and is substantially perpendicular to the main wall 18. The illustrated front-side wall 20 is substantially straight or planar and extends from the transfer portion 14 to the left-side wall 24. The front-side wall is shorter than rear-side wall 22 and left-side wall 24 so as to not impede the user when moving the pills on the floor surface 26. It is noted that the front-side wall 20 can alternatively any other suitable height. It is also noted that the front-side wall 20 can alternatively have any other suitable configuration.

The illustrated rear-side wall 22 upwardly extends from a rear edge of the main wall 18 and is substantially perpendicular to the main wall 18. The illustrated rear-side wall 22 is substantially straight or planar and has a height which is about twice to about three times the height of the front-side wall 20. It is noted that the rear-side wall 22 can alternatively any other suitable height. It is also noted that the rear-side wall 22 can alternatively have any other suitable configuration.

The illustrated left-side wall 24 upwardly extends from a left-side edge of the main wall 18 and is substantially perpendicular to the main wall 18, the front-side wall 20, and the rear-side wall 22. The illustrated left-side wall 24 is substantially straight or planar and has a height which is substantially the same as the rear-side wall 22. That is, the left-side wall 24 has a height which is about two to about three times the height of the front-side wall 20. It is noted that the left-side wall 24 can alternatively any other suitable height. It is also noted that the left-side wall 24 can alternatively have any other suitable configuration.

The illustrated front-side, rear-side, and left-side walls 20 to 24 are continuous to enclose the floor surface 26 on all but its right edge (at the transfer portion 14), its left rear corner (at the return portion 16) and in the upward direction. It is noted that interior joints and/or corners are radiused or smooth to provide a robust structure while not impeding movement of the pills.

The illustrated viewing portion 12 also includes a pair of legs 30 downwardly extending from a bottom side of the main wall 18. The legs 30 cooperate with the transfer portion 14 to support the main wall 18 on a support surface such as, for example but not limited to, a tabletop with the floor surface 26 substantially horizontal or level. It is noted that the legs 30 can alternatively have any other suitable quantity, location, and/or configuration. It is also noted that the viewing portion 12 can alternatively have any other suitable configuration.

The illustrated transfer portion 14 comprises a generally cylindrical-shaped and horizontally-extending transfer chamber 32. The illustrated transfer chamber 32 extends in the forward/rearward direction and is located at the right edge of the main wall 18. The illustrated transfer chamber 32 includes a semi-cylinder trough 34 configured to selectively receive at least some of the pills from the floor surface 26, a semi-cylinder door 36 pivotably secured to the semi-cylinder trough 34 to selectively open and close the semi-cylinder trough 34, a spout 38 forwardly extending from an open end of the semi-cylinder trough 34 and configured to selectively dispense the pills from the semi-cylinder trough 34, and a transfer gate 40 selectively movable between a blocking position to prevent dispensing the pills from the semi-cylinder trough 34 through the spout 38, and a dispensing position to permit dispensing the pills from the semi-cylinder trough 34 through the spout 38.

The illustrated semi-cylinder trough 24 has an open top and extends along and below the right-side edge of the substantially-planar floor surface 26. The illustrated semi-cylinder trough 34 is a half-cylinder to cooperate with the illustrated semi-cylinder door 36 which is also a half cylinder so that they cooperate to form a full cylinder. It is noted that they can alternatively have any other suitable sizes to form a full cylinder. The illustrated semi-cylinder trough 34 has a closed rear end and an open front end configured to cooperate with the spout 39. The illustrated semi-cylinder trough 24 is configured to selectively receive the pills from the floor surface 26 as they are pushed over the lip 28. A left-side upper edge of the semi-cylinder trough 24 is continuous with the floor surface 28. The length of the illustrated semi-cylinder trough 24 in the forward/rearward direction is substantially the same as the length of the viewing platform 17 in the forward/rearward direction. The material of the semi-cylinder trough 24 is integral with the material of the viewing platform 17 to form a one-piece component. It is noted that the semi-cylinder trough 24 can alternatively be secured to the viewing platform 17 in any other suitable manner. It is also noted that the semi-cylinder trough 24 can alternatively have any other suitable size, shape, and/or configuration.

The illustrated semi-cylinder door 36 has an open bottom and extends along and above the semi-cylinder trough 34 to form the transfer chamber 32 in the shape of a hollow cylinder. The illustrated semi-cylinder door 36 is a half-cylinder to cooperate with the illustrated semi-cylinder trough 36 which is also a half cylinder so that they cooperate to form a full cylinder. The length of the illustrated semi-cylinder door 26 in the forward/rearward direction is substantially the same as the length of the semi-cylinder trough 34 in the forward/rearward direction. The illustrated semi-cylinder door 36 is secured to the semi-cylinder trough 34 by a pair of spaced-apart hinges 42 along the right-sides or outer edges of the semi-cylinder trough 34 and the semi-cylinder door 36 so that the semi-cylinder door 36 can selectively be outwardly pivoted to provide access to the interior of the semi-cylinder trough 34. The illustrated hinges 42 have portions 42A, 42B formed on the semi-cylinder trough 34 and the semi-cylinder door 36 respectively which are secured together by screws 44. It is noted that there can alternatively be any other suitable type or quantity of hinges 42. It is also noted that the semi-cylinder door 36 can alternatively be removably secured to the semi-cylinder trough 34 in any other suitable manner. It is further noted that the semi-cylinder door 36 can alternatively have any other suitable size, shape, and/or configuration.

The illustrated semi-cylinder door 36 includes a primary door portion 36A (best shown in FIGS. 11 to 16) and a secondary door portion 36B (best shown in FIGS. 17 to 20). The illustrated secondary door portion 36B is pivotably secured to the primary door portion 36A by a pair of spaced-apart hinges 46 along the right-sides or outer edges of the secondary door portion 36B so that the secondary door portion 36B can selectively be outwardly pivoted to form a gap 48 between the primary door portion 36A and the right-side edge of the floor surface 26. The gap 48 preferably extends for about 45 degrees or less above horizontal but any other suitable size can alternatively be utilized. Thus, the secondary door portion 36B enables the pills to be moved from the floor surface 26 to the semi-cylinder trough 34 while the primary door portion 36A is closed to reduce inadvertent spillage of the pills during the transfer. The illustrated hinges 46 have portions 46A, 46B formed on the primary door 36A and the secondary door 36B respectively which are secured together by screws 50. It is noted that there can alternatively be any other suitable type or quantity of hinges 46. It is also noted that the secondary door 36B can alternatively be removably secured to the primary door 36A in any other suitable manner. It is further noted that the primary and secondary doors 36A, 36B can alternatively have any other suitable size, shape, and/or configuration.

As best shown in FIGS. 17 to 20, the illustrated secondary door 36B also includes a handle 52 configured so that the user can manually push open or pull closed the secondary door 36B. The illustrated handle 50 forwardly extends from a forward end of the secondary door 36B but any other suitable handle configuration can alternatively be utilized.

The dispensing spout 38 extends from the open front end of the semi-cylindrical trough 34 for selectively dispensing the pills from the semi-cylindrical trough 34. The illustrated spout 38 includes upper and lower portions 38A, 38B that together form a circular tube when the semi-cylinder door 36 is closed. The upper portion 38A is secured to the front end of the primary door 36A and lower portion 38*b* is secured to the front end of the semi-cylinder trough 34. Thus, an inner passage 54 of the spout 38 is located at the front open end of the transfer chamber 32 so that the pills can be selectively dispensed from the transfer chamber 32 through the spout 38. The illustrated spout 38 is a funnel. That is, the inner passage 54 of the spout 38 reduces in diameter in the direction from the inlet to the outlet. The outer diameter at the forward or free end of the spout 38 is preferably sized and shaped to be closely received within an inner diameter (ID) of a prescription container or vial. It is noted that the spout 38 can alternatively have any other suitable size, shape, and/or configuration.

The illustrated transfer portion 14 also includes a transfer gate 40 selectively movable between a blocking position to prevent dispensing the pills from the semi-cylindrical trough 34 through the spout 38, and a dispensing position to permit dispensing the pills from the semi-cylindrical trough 34 through the spout 38. As best shown in FIGS. 21 to 25, the illustrated transfer gate 40 is generally hook shaped having blocking portion 41 with a rounded lower edge to block movement of the pills. The illustrated transfer gate 40 is moved between the blocking position and the dispensing position by pivoting about a pivot pin 56. The illustrated pivot pin 56 is in the form of a screw but alternatively can be of any other suitable type. The illustrated pivot pin 56 extends through an opening 55 in the transfer gate 40 and then into a threaded opening 57 in the front of the viewing platform 17 in a rearward direction adjacent the open front end of the semi-cylinder trough 34. Thus, the transfer gate 40 is positioned between the front end of the semi-cylindrical trough 34 and the rear end of the spout 38. The left end of the transfer gate 40 is provided with handle 58 positioned so that the pivot pin 56 is located between the blocking portion and the handle 58. As a result, the blocking portion 41 is raised by downwardly pressing the handle 58 to pivot the transfer gate 40 about the pivot pin 56 and allow the pills to pass under the transfer gate 40 and to and out of the spout 38. When the handle 58 is released, the transfer gate automatically returns to its blocking position via gravity. It is noted that the transfer gate 40 can alternatively be spring loaded toward its blocking position. The illustrated handle 58 is provided with a knurled surface so that it is slip resistant. The illustrated semi-cylindrical trough 34 and primary door 36A are provided with slots 60 for movement of the transfer gate 40 therethrough when it is pivoted upward. The outer surface of the primary door 36A is also provided with a shield 61 for receiving the free end of the transfer gate 40 within an interior passage when the transfer gate 40 is pivoted upward. It is noted that the shield 61 can alternatively have any other suitable configuration or can be eliminated. It is also noted that the transfer gate 40 can alternatively be moved in any other suitable manner. It is further noted that the transfer gate 40 can alternatively have any other suitable size, shape, and/or configuration.

The illustrated return portion 16 is in the form of a channel extending from the floor surface 26 in a direction generally opposed to the direction of the spout 38. The illustrated return portion 16 extends in a rearward and leftward direction. The side walls 62 of the illustrated channel-shaped return portion 16 are extensions of the rear-side wall 22 and the left-side wall 24 of the viewing portion 12. The bottom wall 64 of the illustrated channel-shaped return portion 16 is an extension of the floor surface 26. It is noted that the return portion 16 can alternatively have any other suitable size, shape, and/or configuration.

During use of the pill counter and/or viewer tray 10, a user pours a plurality of pills to counted onto the floor surface 26. The user can view the pills and verify that the pills are of the same desired type. The user then begins counting the pills as they use a spatula or the like to push single pills across the floor surface 26, over the lip 28, and into the semicylindrical trough 34. Preferably, the primary door 36A is closed and the secondary door 36B is open during this step so that the pills pass through the gap 48. This reduces the risk of spilling counted pills during this step. Once the desired number of pills have been pushed into the semi-cylindrical trough 34, the tray 10 is tilted to direct the return portion 16 into the source container of pills and all pills remaining on the floor surface 26 are pushed through the return portion 16 to the source container of pills. Preferably, both the primary door 36A and the secondary door 36B are closed during this step so that no pills fall out of the semi-cylindrical trough. This reduces the risk of spilling pills during this step. Finally, the spout 38 is inserted into a pill bottle or vial and the handle 58 of the transfer gate 40 is pushed down so that the pills in the transfer chamber 32 pass through the spout 38 and into the pill bottle or vial. Note that no pills can pass through the spout 38 from the transfer chamber 32 until the transfer gate is activated/opened. This reduces the risk of spilling pills during this step. From the above description, it can be appreciated that the pill counter and/or viewer trays 10 according to the invention greatly reduce the risk of spilling pills.

The pill counter and/or viewer tray 10 described above can be manufactured by a variety of forming methods including, for example but not limited to, 3D printing, vacuum forming, injection molding and the like. These forming methods can provide smoothly contoured transitions between the various portions of the pill counter and/or viewer tray 10, thereby avoiding edges, crevices, ledges, burrs etc. where pills may become temporarily impeded and/or lodged.

Plastics known in the art may be used to provide pill counter and/or viewer trays 10 capable of withstanding repetitive use as well as high impact forces, such as when inadvertently dropped to the floor. For example, but not limited to, high-density polyethylene (HDPE), low density polyethylene (LDPE), polypropylene (PP) and the like. Due to the wide variety pill colors and compositions, the polymers used to form the pill counter and/or viewer tray 10, or at least portions thereof, preferably include a color that provides a high contrast.

The pill counter and/or viewer tray 10 described above may comprise a variety of sizes and shapes and is in no way limited to the shapes, dimensions, and/or proportions shown in the present figures.

As used in this specification and the claims, the term "spout" means any object having a passage through which liquid or solid contents of a container may be passed or poured. As used in this specification and claims, the term "funnel" means any object forming a passage that is wider at an entrance and narrower at exit, used for guiding liquids or solids into a smaller opening.

The phrase "and/or," as used in this specification should be understood to mean "either or both" of the elements being referred to, i.e., elements that are conjunctively present in some instances and disjunctively present in other instances. Other elements may optionally be present other than the elements specifically identified by the "and/or" clause, whether related or unrelated to those elements specifically identified unless clearly indicated to the contrary.

As used in this specification, the term "preferably" refers to one or more exemplary embodiments of the invention and therefore is not to be interpreted in any limiting sense.

The terms "comprises," "comprising," "includes," "including," "has," "having," or any other variations thereof used herein, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference to "one embodiment," "certain embodiments," "an embodiment," "implementation(s)," "aspect(s)," or similar terms used herein means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

It will be understood that terms of orientation and/or position as may be used throughout the specification and claims, such as upper, lower, rear, side, forward, downward, upward, inner, and so on, as well as their derivatives and equivalent terms, relate to relative rather than absolute orientations and/or positions.

All patents, patent applications (and any patents which issue thereon, as well as any corresponding published foreign patent applications), publications, and other documents mentioned throughout this description are hereby incorporated by reference herein. It is expressly not admitted, however, that any of the documents incorporated by reference herein teach or disclose the present invention.

The words "about," "approximately," or the like, when accompanying a numerical value, are to be construed as indicating a deviation as would be appreciated by one of ordinary skill in the art to operate satisfactorily for an intended purpose.

It should be understood that every maximum numerical limitation used herein includes every lower numerical limitation, as if such lower numerical limitations were expressly written herein. Every minimum numerical limitation used herein includes every higher numerical limitation, as if such higher numerical limitations were expressly written herein. Every numerical range herein includes every narrower numerical range that falls within such broader numerical range, as if such narrower numerical ranges were all expressly written herein.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

References herein to items in the singular should be understood to include items in the plural, and vice versa, unless explicitly stated otherwise or clear from the text.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A pharmacy pill tray for viewing and/or counting pills, said pharmacy pill tray comprising:

a viewing platform comprising a substantially-planar floor surface configured to support the pills thereon;

a trough with an open top extending along and below an edge of the substantially-planar floor surface and configured to selectively receive at least some of the pills from the floor surface;

wherein the trough is generally a semi-cylinder having a closed end and an open end;

a dispensing spout extending from the open end of the trough for selectively dispensing the pills from the trough;

a transfer gate having a blocking portion and a handle movable with the blocking portion, wherein the blocking portion is selectively movable between a blocking position to prevent dispensing the pills from the trough through the spout, and a dispensing position to permit dispensing the pills from the trough through the spout, and wherein the handle is located outside of the trough and the dispensing spout and is configured to selectively pivot the blocking portion between the blocking position and the dispensing position when the handle pivots about a pivot; and wherein the transfer gate is pivotably mounted to pivot the blocking portion between the blocking position and the dispensing position with a pivot pin located between the blocking portion and the handle.

2. The pharmacy pill tray according to claim 1, wherein the transfer gate is configured to manually move the blocking portion between the blocking position and the dispensing position.

3. The pharmacy pill tray according to claim 1, wherein the transfer gate is pivotably mounted to the viewing platform with the pivot pin secured to the viewing platform.

4. The pharmacy pill tray according to claim 1, wherein the blocking portion is located between the dispensing spout and the trough.

5. The pharmacy pill tray according to claim 1, further comprising a return spout extending from of the substantially-planar floor surface in a direction at least partially opposed to the dispensing spout and configured to return any remaining ones of the pills from the substantially-planar floor surface.

6. The pharmacy pill tray according to claim 5, wherein the substantially-planar floor is generally rectangular shaped, the return spout extends from a rear/right corner of the substantially-planar floor surface, and the dispensing spout extends from a left front corner of the substantially-planar floor surface.

7. The pharmacy pill tray according to claim 1, further comprising a semi-cylinder door pivotably secured to the trough to form a cylinder-shaped transfer chamber.

8. The pharmacy pill tray according to claim 7, wherein the semi-cylinder door includes a primary door portion pivotably secured to the trough, and a secondary door portion pivotably secured to the primary door portion, wherein the primary and secondary door portions are configured to form a small gap along the substantially-planar floor surface when the primary door portion is closed and the secondary door portion is open so that at least some of the pills can be moved from the floor surface to the trough through the gap and configured to close the gap when both the primary door portion and the secondary door portion are closed so that the pills cannot be moved from the substantially-planar floor surface to the trough through the gap.

9. A pharmacy pill tray for viewing and/or counting pills, said pharmacy pill tray comprising:

a viewing platform comprising a substantially-planar floor surface configured to support the pills thereon;

a transfer chamber including a semi-cylinder trough with an open top extending along and below an edge of the substantially-planar floor surface and configured to selectively receive at least some of the pills from the floor surface, and a semi-cylinder door pivotably secured to the trough to selectively open and close the open top of the trough;

wherein the transfer chamber has a closed end and an open end;

wherein the semi-cylinder door includes a primary door portion pivotably secured to the trough, and a secondary door portion pivotably secured to the primary door portion, wherein the primary and secondary door portions are configured to form a small gap along the substantially-planar floor surface when the primary door portion is closed and the secondary door portion is open so that at least some of the pills can be moved from the floor surface to the trough through the gap and configured to close the gap when both the primary door portion and the secondary door portion are closed so that the pills cannot be moved from the substantially-planar floor surface to the trough through the gap; and a dispensing spout extending from the open end of the trough for selectively dispensing the pills from the trough.

10. The pharmacy pill tray according to claim 9, wherein the dispensing chamber is generally cylindrical-shaped.

11. The pharmacy pill tray according to claim 9, further comprising a transfer gate selectively movable between a blocking position to prevent dispensing the pills from the trough through the spout, and a dispensing position to permit dispensing the pills from the trough through the spout.

12. The pharmacy pill tray according to claim 11, wherein the transfer gate is configured to manually move between the blocking position and the dispensing position.

13. The pharmacy pill tray according to claim 11, wherein the transfer gate is pivotably mounted to pivot between the blocking position and the dispensing position.

14. The pharmacy pill tray according to claim 13, wherein the transfer gate is pivotably mounted to the viewing platform.

15. The pharmacy pill tray according to claim 9, wherein the dispensing spout is a funnel.

16. The pharmacy pill tray according to claim 9, further comprising a return spout extending from of the substantially-planar floor surface in a direction at least partially opposed to the return spout and configured to return any remaining ones of the pills from the substantially-planar floor surface.

17. The pharmacy pill tray according to claim 16, wherein the substantially-planar floor surface is generally rectangular shaped, the return spout extends from a rear/right corner of the substantially-planar floor surface, and the dispensing spout extends from a left front corner of the substantially-planar floor surface.

18. A pharmacy pill tray for viewing and/or counting pills, said pharmacy pill tray comprising:

a viewing platform comprising a substantially-planar and upward-facing floor surface configured to support the pills thereon;

a generally cylindrical-shaped and horizontally-extending transfer chamber including a semi-cylinder trough with an open top extending along and below an edge of the substantially-planar floor surface and configured to selectively receive at least some of the pills from the floor surface, and a semi-cylinder door pivotably secured to the trough to selectively open and close the open top of the trough;

wherein the semi-cylinder door includes a primary door portion pivotably secured to the trough, and a secondary door portion pivotably secured to the primary door portion, wherein the transfer chamber has a closed end and an open end;

a dispensing spout extending from the open end of the trough for selectively dispensing the pills from the trough; and a transfer gate selectively movable between a blocking position to prevent dispensing the pills from the trough through the spout, and a dispensing position to permit dispensing the pills from the trough through the spout.

19. The pharmacy pill tray according to claim 18, wherein the primary and secondary door portions are configured to form a small gap along the substantially-planar floor surface when the primary door portion is closed and the secondary door portion is open so that at least some of the pills can be moved from the floor surface to the trough through the gap and configured to close the gap when both the primary door portion and the secondary door portion are closed so that the pills cannot be moved from the substantially-planar floor surface to the trough through the gap.

* * * * *